Aug. 23, 1938.  F. C. JEARUM  2,127,998
INSERTED SHAPED TIP TOOL BIT
Filed June 16, 1936
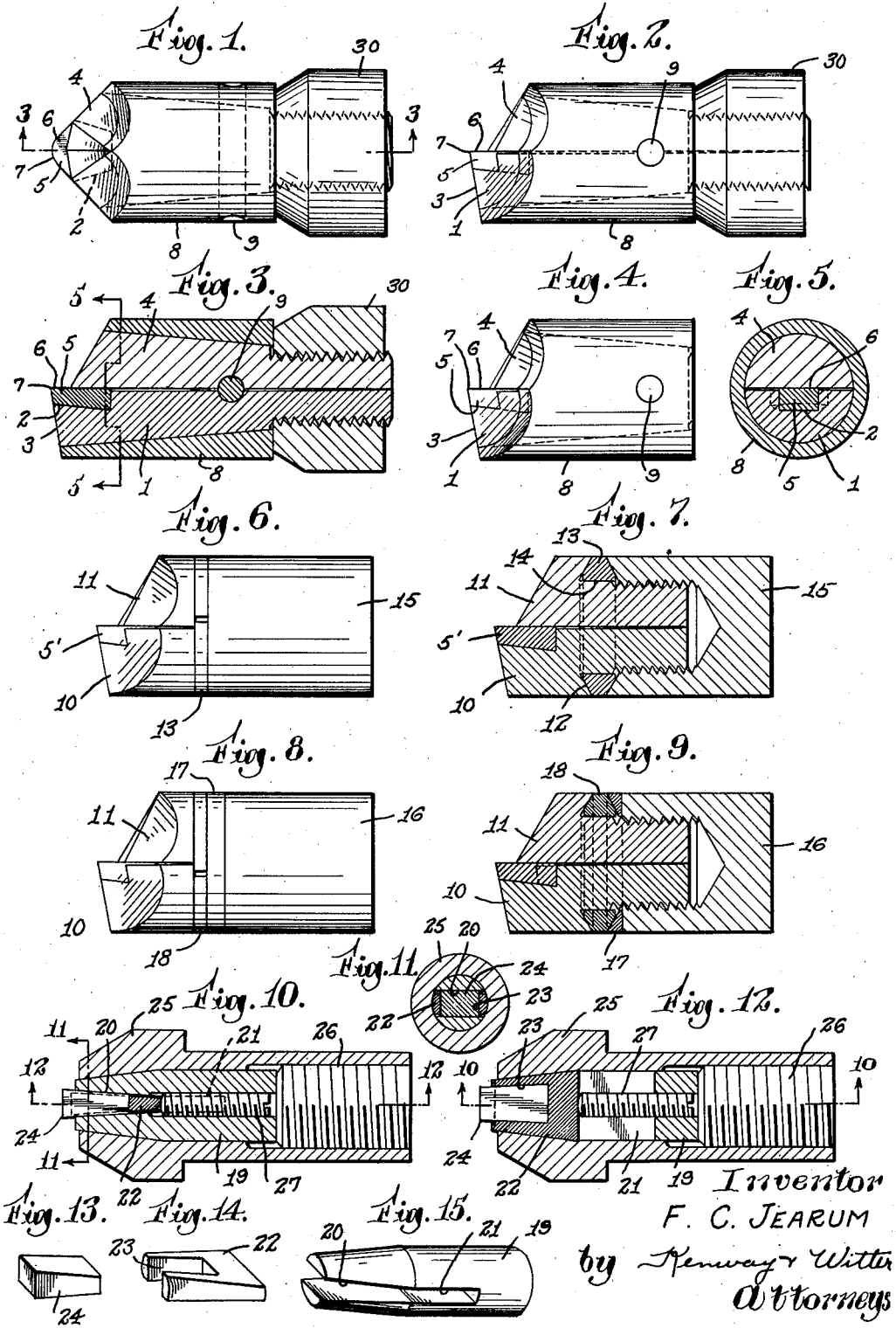
Inventor
F. C. JEARUM
by Kenway & Witter
Attorneys Patented Aug. 23, 1938

2,127,998

UNITED STATES PATENT OFFICE 2,127,998

INSERTED SHAPED-TIP TOOL-BIT

Frederick Charles Jearum, Chipstead, England

Application June 16, 1936, Serial No. 85,600
In Great Britain June 17, 1935

9 Claims. (Cl. 29—96)

This invention relates to super-hard tipped tools and more especially to such tools in which a shaped and polished super-hard cutting or dressing tip, of diamond, tungsten carbide or the like is adequately supported in a tool shank mounting for application to the duty of turning, precision dressing, boring and similar operations and is retained securely in the said mounting by means carried into effect without the necessity of using heat.

A further feature of the invention resides in so affecting the aforesaid mounting that the tool tip may be removed from and replaced in its mounting and serve to affect the holding of the tool tip with the greatest degree of compactness and stability.

In carrying my invention into effect, I have employed the general principle of a collet, the collet being constructed and arranged to receive and firmly support the tool tip therein and co-operating means being employed securely to bind the collet jaws on to the tip and the tip in accurate working position.

These and other features of the invention will be best understood and appreciated from the accompanying drawing and the following specification illustrating and describing certain preferred embodiments of the invention which I have developed.

In the drawing,

Fig. 1 is a plan elevation of a cutting tool embodying my invention, the tool being shown in process of construction, Fig. 2 is a side elevation thereof, Fig. 3 is a longitudinal sectional view taken on line 3—3 of Fig. 1, Fig. 4 is a side elevation of the completed tool, Fig. 5 is a cross sectional view taken on line 5—5 of Fig. 3, Fig. 6 is a side elevation of another form of cutting tool embodying the invention, Fig. 7 is a longitudinal sectional view thereof, Fig. 8 is a side elevation of a further form of cutting tool embodying the invention, Fig. 9 is a longitudinal sectional view thereof, Fig. 10 is a longitudinal sectional view through a dressing tool embodying the invention, Fig. 11 is a cross sectional view taken on line 11—11 of Fig. 10, Fig. 12 is a longitudinal sectional view taken at right angles to that of Fig. 10, Figs. 13, 14 and 15 are views in elevation showing detail parts of this tool.

Referring first to the form of invention illustrated in Figs. 1-5, 1 and 4 indicate the two jaws of a split collet having the rear end thereof threaded and the forward end conically tapered exteriorly. The member 1 has a cavity 2 formed in its forward end corresponding to the shape of that part of the diamond or other tip 5 which is not to be exposed. This cavity 2 is of such depth that the upper face or table 6 of the tip 5 is very slightly proud of the flat surface of the member 1.

The member 1 is generally formed at its end 3 to correspond with the front relief of the cutting tip. The second member 4 has a flat face cooperating with the corresponding face of the member 1 and is shorter than the member 1 whereby to expose the part of the table 6 immediately in the rear of the cutting edge 7. The forward face of the member 4 is also inclined rearwardly to provide chip clearance.

When the members 1 and 4 are in assembled relation, with the tip 5 held therebetween, they form a round body having a conical forward portion and a threaded rear portion. Cooperating with and enclosing this body is a cylindrical sleeve 8 provided therein with a conical bore corresponding with the conical portion of the body 1—4.

The sleeve 8 extends somewhat rearwardly of this conical portion and in position to be engaged by a nut 30 threaded onto the rear end of the body. Tightening of this nut draws the body into the sleeve and presses the members 1 and 4 into clamping engagement with the tip 5. The tool is then completed by drilling a hole through the sleeve and into both parts 1 and 4 of the body and driving a pin 9 tightly into this hole. The threaded shank together with the nut 30 are then cut off flush with the end of the sleeve, the resulting tool being illustrated in Fig. 4.

In Figs. 6 and 7 is illustrated a form of the invention embodying two collet-like members 10 and 11 cooperating to form a cylindrical body having a forward tool holding head and a rearwardly extending threaded shank. The forward ends of these members are recessed in like manner as the tool of Fig. 4 to receive and support a cutting tip 5'. Cooperating with this body and in threaded engagement with the shank portion is a threaded socket 15.

A split ring 13 is mounted on a correspondingly cylindrical portion 14 of the shank forwardly of the socket 15, the sides 12 of the ring converging outwardly to form a substantially triangular section as illustrated in Fig. 7. The cooperating faces of the tool holding head and the socket are likewise tapered to fit the tapered faces 12 of the ring.

After the members 10 and 11 together with the tip 5' and ring 13 are assembled, the socket 15 is screwed on to the shank tightly against the ring. This action contracts the ring and binds the members 10 and 11 into clamping engagement with the tip. In such position of the parts, the ring is nearly completely encircled between the tool head and the socket and the parts are effectively held and supported in this position by the solid socket. It will be noted in the completed tool the combined tool head, ring and socket provide a shank of uniform diameter throughout.

The form of invention illustrated in Figs. 8 and 9 is substantially like that shown in Figs. 6 and 7, this form however employing a solid ring 17 between the forward end of the socket 16 and the split ring 18. The forward face of the ring 17 is tapered or bevelled to fit the rear bevelled face of the ring 18, the rear end of the ring 17 having a flat face engaging a corresponding flat face on the forward end of the socket 16. The parts are brought to the final tip holding position by screwing the socket 16 tightly onto the threaded shank. The ring 17 is a sufficiently weak section to stretch when forced against the ring 18 by the socket, the ring 17 being finally trimmed flush to the diameter of the tool head and socket.

There are cases in which the tip holding cavity is formed jointly in the upper and lower members and by a member or members affording side constraint to the tip. Such a case is illustrated in the precision dressing tool shown in Figs. 10–15, in which a diamond 24 shaped and polished to truncated tetrahedral form is usually employed.

In this construction the upper and lower members are formed as one piece 19 having an inwardly tapered slot 20 which is continued with a parallel portion 21. A second member 22 is formed with a slot 23 tapering outwardly. The slots 20 and 23 in the members 19 and 22 are proportioned to fit the diamond respectively on alternate pairs of sides. The member 22 is otherwise formed to pass freely into the slots 20 and 21 in the member 19 so that the diamond 24 when in the slot 23 will snugly fit the slot 20 and leave clearance between the member 22 and the bottom of the slot 21.

The exterior surface of the front end portion of the combined members 19 and 22 is formed in the shape of a cone to fit a like conical hole in the forward end of an encircling member 25. The rear portion of the hole through this member 25 is screw threaded to receive a threaded plug 26 whereby to force the combined members 19 and 22 forwardly, such action together with conical surfaces serving to bind the tip 24 securely between the four opposed engaging surfaces.

A screw 27 threaded into the member 19 is a convenience for supporting the member 22 when inserting the two members with the diamond 24 into the encircling member 25. The plug 26 is finally cut off flush with the rear end of the member 25.

What I claim is:

1. A tool of the class described, comprising a member having a threaded bore in its forward end and a rearwardly extending shank, opposed elements threaded into the bore and projecting from the forward end of the member, the forward ends of the elements having opposed faces and a recess therebetween, a superhard tool tip fitted into the recess with said faces in engagement therewith and the forward end of the tip projecting forwardly of the elements, and cooperating means including co-engaging surfaces inclined longitudinally of the tool for holding the tip firmly gripped between the elements.

2. A tool of the class described, comprising a member having a supporting shank, opposed elements extending thereinto and projecting from the forward end thereof, the forward ends of the elements having opposed faces and a recess therebetween, a super-hard tool tip fitted into the recess with said faces in engagement therewith and the forward end of the tip projecting forwardly of the elements, a split ring surrounding said elements, and means including co-engaging inclined surfaces on the ring and tool for contracting the ring into tip-binding engagement with the elements.

3. A tool of the class described, comprising a member having a threaded bore in its forward end and a rearwardly extending shank, opposed elements threaded into the bore and projecting from the forward end of the member, the forward ends of the elements having opposed faces and a recess therebetween, a superhard tool tip in the recess with said faces in engagement therewith and the forward end of the tip projecting forwardly of the elements, a split ring surrounding said elements, and means, including co-engaging surfaces on the ring and tool and the screw threads between said member and elements, for contracting the ring into tip-binding engagement with the elements.

4. A tool of the class described, comprising an elongated member having a threaded bore in its forward end, opposed elements threaded into the bore and projecting from the forward end of the member, one element having a recess in its forward end, a super-hard tool tip in the recess and projecting therefrom forwardly of the elements, the tip being slightly thicker than the depth of the recess and engaged on its top surface by the other element, a split ring surrounding the elements, and means for holding the ring tightly compressed on the elements whereby binding the tip firmly between the elements in the recess.

5. A tool of the class described, comprising an elongated member having an open bore in its forward end and a shank portion extending rearwardly, tool tip holding means within the bore and including opposed portions having a tool tip holding recess therebetween at the forward ends thereof and projecting from the forward end of said member, a super-hard tool tip in the recess projecting longitudinally of the tool from the forward end of said holding means and having non-parallel opposed faces engaged by corresponding faces of said opposed portions, means including interengaging surfaces tapering longitudinally of the tool for holding said opposed portions in tip binding contact with said non-parallel opposed faces of the tip when said member and tip holding means are moved relatively and longitudinally to a tip binding position, and means within the elongated member for holding said member and tip holding means in tip binding position.

6. The tool defined in claim 5 wherein said inter-engaging surfaces are carried by said member and tip holding means and wherein the last-named means of claim 5 includes a pin extending transversely through the tool and securing said member and the tip holding means against relative movement longitudinally.

7. The tool defined in claim 5 wherein the last-named means includes screw threads extending along and within the bore and in threaded engagement with cooperating threads integral with said member.

8. A tool of the class described, comprising an elongated member having an open bore in its forward end and a shank portion extending rearwardly, tool tip holding means within the bore and including opposed portions having a tool tip holding recess therebetween at the forward ends thereof, a super-hard tool tip in the recess projecting longitudinally of the tool from the forward end of said holding means and having non-parallel opposed faces engaged by corresponding faces of said opposed portions, means anchoring the tip immovably in the recess with the last-named faces in fixed and firm surface contact with said non-parallel faces of the tip, the forward end of said tip being relieved in a manner leaving the forward end of the top surface thereof projecting further forward than the forward end of the bottom surface, and said bottom surface being supported to its extreme forward edge by one of said portions and the top surface being supported by the other of said portions short of the extreme forward edge thereof.

9. A tool of the class described, comprising an elongated member having a bore extending longitudinally therethrough, tool tip holding means within the bore and including opposed portions having a tool tip holding recess therebetween at the forward ends thereof, a super-hard tool tip in the recess projecting longitudinally of the tool from the forward end of said holding means and having non-parallel opposed faces engaged by corresponding faces of said opposed portions, said opposed portions and member having interengaging surfaces tapering longitudinally of the tool for holding said opposed portions in tip binding contact with said non-parallel opposed faces of the tip when the tip holding means is moved forwardly in the member to a tip binding position, and means screw threaded to the member within the bore rearwardly of the tip holding means for forcing the tip holding means forwardly to said position and holding the same in such position.

FREDERICK CHARLES JEARUM.